March 31, 1970    A. R. UHLIG    3,503,095

INJECTED PARISON BLOW MOLDING APPARATUS

Filed Oct. 30, 1967    3 Sheets-Sheet 1

INVENTOR.
ALBERT R. UHLIG.
BY Philip M. Rice
& W. A. Schaich
ATT'YS.

FIG. 3
FIG. 4
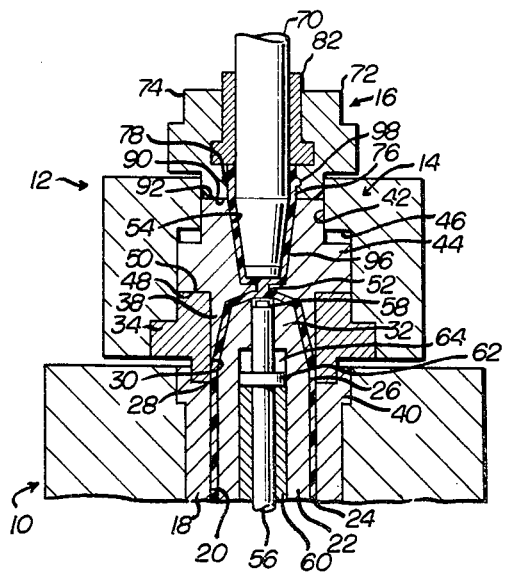
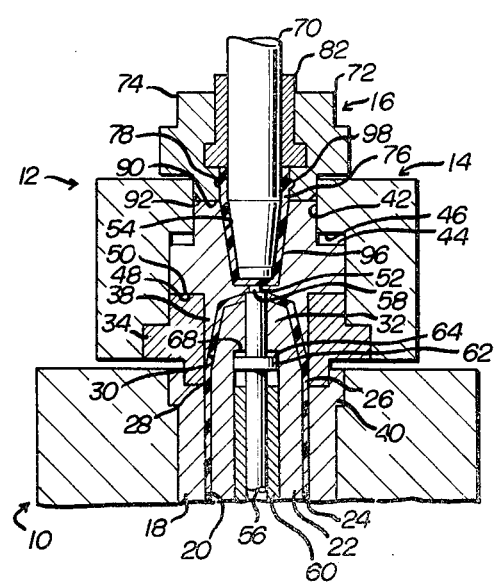

March 31, 1970 A. R. UHLIG 3,503,095
INJECTED PARISON BLOW MOLDING APPARATUS
Filed Oct. 30, 1967 3 Sheets-Sheet 3

INVENTOR.
ALBERT R. UHLIG.
BY Philip M. Rice
& W. A. Schaich
ATT'YS.

United States Patent Office

3,503,095
Patented Mar. 31, 1970

---

3,503,095
INJECTED PARISON BLOW MOLDING APPARATUS
Albert R. Uhlig, Toledo, Ohio, assignor to Owens-Illinois, Inc., a corporation of Ohio
Filed Oct. 30, 1967, Ser. No. 679,126
Int. Cl. B29c
U.S. Cl. 18—5                3 Claims

---

ABSTRACT OF THE DISCLOSURE

Plastic articles are formed by a combination of injection molding and blow molding wherein a plastic parison is formed by movement of a mold assembly to reduce the volume of a body of plasticized material and thereby displace plasticized material from the body into the mold assembly. The mold assembly includes a first movable mold part having a core pin and an annular structure about the core pin forming with the core pin a finish space for the molding of a finish portion of a parison. The mold assembly also includes a second movable mold part which defines part of a chamber for containing the body of plasticized materials, and the second mold part has a gate opening which is normally blocked by a movable blocking member. The first mold part is moved into contact with the second mold part to form a mold cavity which communicates with the finish space about the core pin, the blocking member is moved out of the gate opening, and the first and second mold parts are moved jointly to reduce the volume of the chamber and thereby inject plasticized material through the gate opening into the mold cavity and the finish space to form a parison. Next, the gate opening is closed by the blocking member. The mold parts and the blocking member are then returned to positions wherein the chamber is at its original volume, and the first mold part is moved further with the plastic parison thereon to a blowing station. Blow molds close on the parison, and a blowing medium is introduced into the parison through the core pin to blow the parison into conformity with the blow molds and thereby form a complete article having a finish portion formed by the finish space of the first mold part.

---

BACKGROUND OF THE INVENTION

This invention relates to a method of and apparatus for making plastic articles by a combination of injection molding and blow molding, and more particularly to a method and apparatus whereby a parison is formed by displacement of plasticized material into a mold cavity by movable mold parts, the neck or finish of the parison being formed by injection of plasticized material into a finish space provided on one of the mold parts. After separation of the mold parts, the parison is blown in a blow mold to form the final plastic article.

In modern machines for forming plastic articles by injection and blow molding, the plasticized material is injected into a mold cavity to form a parison by an injection ram or a reciprocating screw extruder which itself provides the function of a ram. The ram or reciprocating screw extruder is expensive, and it would be desirable to avoid such expensive machinery. Furthermore, the machinery operates at very high pressures which call for very high mold clamping forces, thus complicating the machinery and making it still more expensive. It has also been difficult to control injection pressure to maintain a certain injection pressure throughout the entire injection head system.

It has been proposed, for example, in U.S. Patent No. 3,032,810 to L. D. Soubier assigned to the present assignee, to inject plasticized material into a mold from a displacement chamber by utilizing movement of the mold to reduce the volume of the displacement chamber. This basic principle is utilized in the present invention. The patent, however, did not contemplate injection of material into a cavity formed by separable mold parts so as to form a complete parison. Rather a parison was formed by extrusion after only a finish had been formed by injection.

SUMMARY OF THE INVENTION

The present invention provides an apparatus in which movable molds displace plasticized material from a chamber into a mold cavity at very high filling speed, the mold cavity communicating with a finish space provided on one of the mold parts for forming the neck or finish of a parison. After molding of the parison is completed, the mold parts are separated to move the parison to a blowing station, blow molds are closed about the parison, and the parison is blown to conform to the shape of the blow molds to provide the final article.

The invention eliminates any need for an injection ram or reciprocating screw extruder, thus reducing the cost of the machinery. It is possible to control the injection pressure more accurately than with commonly used injection and blowing machinery. No overlapping cycles are needed because while the parison is being blown, the displacement chamber is being filled up. Injection pressure can be varied by control of the speed with which the mold parts move during displacement of plasticized material. Among the other advantages of the invention are: (1) shorter residence time of plastic melt in the injection head than in previous apparatus, (2) faster parison cure time due to higher injection pressure, (3) less parison shrinkage, (4) non-critical temperature control for the molds.

It is, therefore, an object of the present invention to provide an improved apparatus for forming plastic articles by displacement molding and blow molding principles.

Another object of the invention is to accomplish molding of a parison including a finish by displacement molding, and then form the parison into a final article by blow molding.

A further object of the invention is to provide a molding apparatus in which opening and closing of a gate provided in a displacement mold is coordinated with the movement of the molds to displace plasticized material.

Other objects of this invention will appear in the following description and appended claims, reference being had to the accompanying drawings forming a part of this specification wherein like reference characters designate corresponding parts in the several views.

ON THE DRAWINGS

FIGURE 3 shows the condition of the apparatus after the two mold parts have moved jointly to reduce the volume of a displacement chamber and force plasticized material into a mold cavity and neck space formed by the mold parts;

FIGURE 4 shows the condition of the apparatus at the next stage after the gate blocking member has moved to close the gate opening.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

AS SHOWN ON THE DRAWINGS

Figure 1:
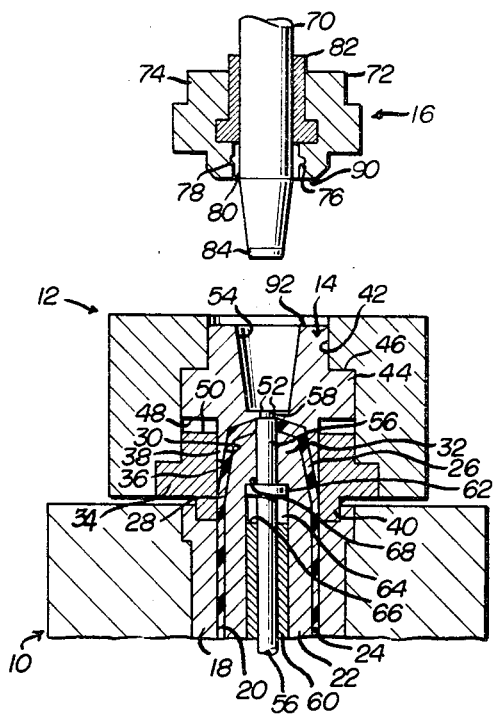
FIGURE 1 is a cross sectional view showing apparatus in accordance with one embodiment of the invention with movable mold parts in an initial open position.
Figure 2:
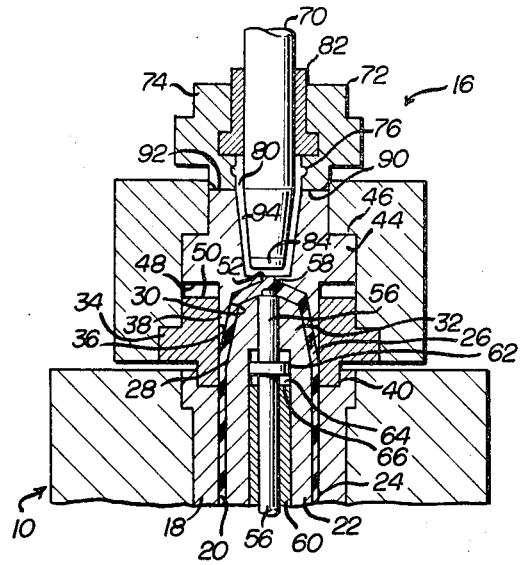
FIGURE 2 shows the condition of the apparatus after an upper mold part has moved into contact with a lower mold part and a gate blocking member has moved to open a filling gate.

FIGURES 1 through 5 show apparatus in accordance with one embodiment of the invention, and also illustrate the steps of the method of the invention. Referring first to FIGURE 1, a molding apparatus is shown including a stationary base 10, a stationary injection head 12, a lower mold part 14 which is movable vertically within the injection head 12, and an upper mold part 16 which is movable vertically relative to the lower mold part 14. The base 10 includes an annular sleeve 18 which has an internal bore surface 20 extending through it. Within and spaced radially from the bore surface 20 is a fixed mandrel 22, and the bore surface 20 and the mandrel 22 define a passageway 24 which is in communication with a source of plasticized material such as a screw extruder (not shown).

The passageway 24 also communicates with a displacement chamber 26, one wall 28 of which is defined by the tip 32 of mandrel 22, and the other wall 30 of which is formed by the lower mold part 14. Plasticized material is supplied into the displacement chamber 26 through the passageway 24 from the source of plasticized material.

The injection head 12 includes a ring 34 having an inner annular surface 36 in which a depending portion 38 of the lower mold part 14 is slidably movable. Inner surface 36 of ring member 34 is in registry with the internal bore surface 20 of sleeve 18. The main injection head body 12 is affixed to the ring 34 as by screws (not shown) and ring 34 is affixed to base 10 as by screwing threads on a projection 40 into matching threads on sleeve 18.

Lower mold part 14 is initially in a raised position wherein the displacement chamber 26 is at its maximum volume. Lower mold part 14 fits within an annular surface 42 of injection head 12 with a sliding fit to allow lower mold part 14 to move vertically. Lower mold part 14 has a radially projecting portion 44 which abuts against a shoulder 46 of injection head 12, the surface 46 forming a stop to prevent upward movement of lower mold part 14 beyond its initial position in FIGURE 1. The radial projection 44 has a surface 48 which is spaced from a surface 50 of ring member 34 when lower mold part 14 is in its initial raised position. The lower mold part can move downwardly until surface 48 abuts surface 50. Thus, lower mold part 14 is vertically movable within the limits defined by surfaces 46 and 50.

Lower mold part 14 has a gate opening 52 extending through it which allows plasticized material to flow from the displacement chamber 26 through opening 52 into the recessed surface 54 of the lower mold part. However, gate opening 52 is initially closed by a plunger 56 which has a reduced tip 58 fitting within opening 52. Plunger 56 extends through the mandrel 22 and is movable vertically within the mandrel. The plunger is guided by a sleeve 60 fitting within mandrel 22. The plunger 56 has a radially enlarged portion 62 which rides in a space 64 between the upper end 66 of the sleeve 60 and a shoulder 68 of mandrel 22. Thus plunger 56 is free to move vertically between the limits defined by shoulder 68 of mandrel 22 and the upper end 66 of sleeve 60. Plunger 56 is urged to its initial raised position wherein it blocks gate opening 52 as by means of a spring or hydraulic pressure, and plunger 56 pushes lower mold part 14 to its initial raised position as shown in FIGURE 1.

The upper mold part 16 is initially in a raised position spaced above the lower mold part 14 as shown in FIGURE 1. Upper mold part 16 includes a core pin 70 and a pair of neck ring members 72 and 74 which form an annular neck ring about the core pin 70. Neck ring members 72 and 74 have semi-annular surfaces 76 and 78 which together form an annular surface encircling and spaced from the core pin 70 to provide a neck molding space 80. Neck ring members 72 and 74 are mounted on a sleeve 82 which allows the neck ring members to be separated laterally to accommodate removal of a neck or finish portion of a parison as will be explained.

Core pin 70 includes a valve head 84 attached to a stem 86 (FIGURE 5) which extends through the center of the core pin and is movable vertically relative to the remainder of the core pin. Valve stem 86 is hollow and communicates with a source of a blowing medium such as air. Initially, valve stem 86 is retracted within the tip of core pin 70 so that valve head 84 abuts against the tip of core pin 70. When valve stem 86 is moved downward slightly, valve head 84 separates from the rest of the core pin to provide a space for issuing air from the hollow valve stem 86. There are openings through the end of valve stem 86 which communicate with the space between head 84 and the tip of core pin 70 when the valve stem 86 is extended.

Mold part 16 can be raised and lowered by means of a hydraulic cylinder and piston (not shown) connected to the core pin 70. As previously mentioned, FIGURE 1 shrows the apparatus in its initial condition, and FIGURES 2 through 5 show the condition of the apparatus as various steps of the method are carried out.

The first step is to move the upper mold part 16 downwardly to bring surface 90 thereof into contact with upper surface 92 of the lower mold part 14. Shortly before surface 90 contacts surface 92, the gate blocking plunger 56 is moved downward to remove its tip 58 from gate opening 52. After these first two steps, the apparatus is in the condition shown in FIGURE 2. It may be seen that core pin 70 is inserted within recess surface 54 of lower mold part 14, and core pin 70 and lower mold part 14 define a mold cavity 94 which communicates with the neck space 80 of upper mold part 16. The mold cavity 94 also communicates through gate opening 52 with the displacement chamber 26 since the blocking plunger 56 has been moved out of the gate opening 52.

The upper mold part 16 continues moving downwardly pushing the lower mold part 14 ahead of it to reduce the volume of the displacement chamber 26 and thereby forces plasticized material from chamber 26 through gate opening 52 into mold cavity 94 and neck space 80, thereby forming a plastic parison 96 having a neck or finish portion 98 as shown in FIGURE 3. The upper and lower mold parts continue moving downwardly until surface 48 of lower mold part 14 abuts against surface 50 of ring 34, and at this stage, as shown in FIGURE 3, the mold cavity 26 has been reduced in volume considerably.

Next, blocking plunger 56 is moved upwardly to insert its tip 58 into gate opening 52, thereby closing the gate opening. The condition of the apparatus after this step is shown in FIGURE 4. It may be noted that the plunger 56 is not fully extended since there is a space between radial enlargement 62 and shoulder 68 of mandrel 22, and this space allows for further upward movement of the blocking plunger 56 during return movement of the mold parts 14 and 16.

The upper mold part 16 is then raised by the piston and cylinder arrangement provided therefor. The lower mold part 14 and the blocking plunger 56 follow the upper mold part 16 in the upward direction due to biasing force exerted on the plunger 56 as previously mentioned. Lower mold part 14 and plunger 56 move along with upper mold part 16 until the radial enlargement 44 of lower mold 14 abuts against shoulder surface 46 of injection head 12. At this point, lower mold part 14 and plunger 56 are halted. Upper mold part 16 continues moving upwardly and strips the parison 96 from the lower mold part 14. Upper mold part 16 stops when it reaches its initial position (the position of FIGURE 1) and the final article is then ready to be blown.

Figure 5:
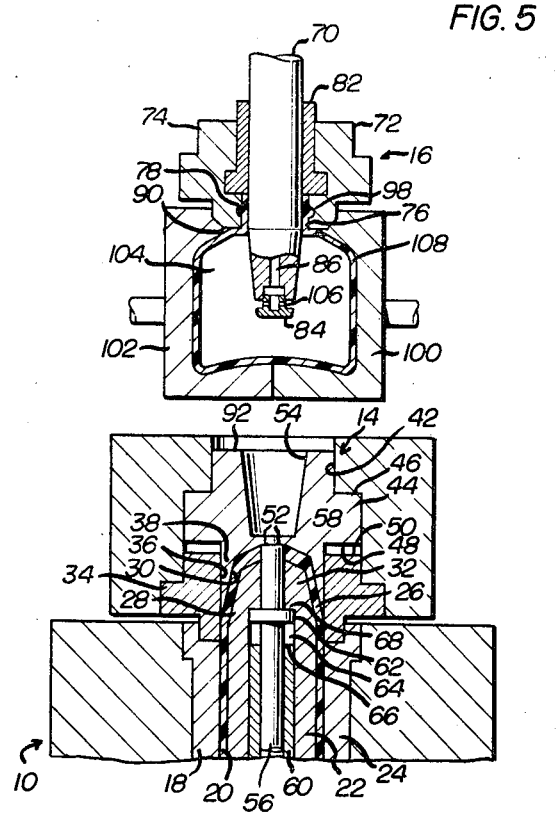
FIGURE 5 shows the condition of the apparatus after the injection mold parts have been separated to carry a parison to a blow molding station, blow molds have closed on the parison and the parison has been inflated to conform with the blow molds.

The blowing of the parison 94 into a final article is illustrated in FIGURE 5. Blow mold halves 100 and 102 have closed laterally about the parison and fit with the neck ring members 72 and 74 as shown in FIGURE 5 to form a blow molding cavity 104. Valve head 84 has been moved downward from the tip of core pin 70 to provide a passage 106 through which air may pass to the inside of the parison. Air is introduced through the hollow stem 86, through passage 106 and into the inside of the parison to expand the parison against the walls of the blow mold sections 100 and 102. This forms the final article 108 having a finish portion 98 integral therewith. To eject the final article 108, the blow mold halves 100 and 102 are seperated laterally to release the body of the container 108 and neck ring halves 72 and 74 are also separated laterally to release the neck or finish portion 98 of container 108. The container 108 is then removed from the apparatus, and the apparatus is in condition to start another injection molding and blowing cycle.

Having thus described my invention, I claim:

1. In an apparatus for making plastic articles by injection molding and blowing, a first movable mold part including a core pin and annular means about said core pin forming with said core pin a finish space for the molding of a finish portion of a parison, means including a second movable mold part defining a chamber of variable volume for containing a body of plasticized material, means for filling said chamber with plasticized material, said second movable mold part having a gate opening therein, a movable blocking means normally closing said gate opening, drive means for moving said first mold part (1) into contact with said second mold part to form a mold cavity communicating with said finish space, and (2) jointly with said second mold part toward said chamber to reduce the volume of said chamber and thereby force plasticized material from said chamber through said gate opening into said mold cavity and said finish space to form a parison, means for moving said movable blocking means to open said gate opening in response to the movement of said first mold part, said movable blocking means closing said gate opening upon completion of the filling of said mold cavity, means for returning said first and second mold parts to positions wherein said chamber is at the original volume thereof and for separating said first mold part with said parison from said second mold part, blow mold means, and means for blowing said parison to conform to said blow mold means to thereby form a complete article having a finish formed by said finish space.

2. In an apparatus for making plastic articles by injection molding and blowing, a first movable mold part including a core pin and annular means about said core pin forming with said core pin a finish space for the molding of a finish portion of a parison, means including a second movable mold part defining a chamber of variable volume for containing a body of plasticized material, means for filling said chamber with plasticized material, drive means for moving said first mold part (1) into contact with said second mold part to form a mold cavity communicating with said finish space, and (2) jointly with said second mold part toward said chamber to reduce the volume of said chamber and thereby force plasticized material from said chamber into said mold cavity and said finish space to form a parison, means for returning said first and second mold parts to positions wherein said chamber is at the original volume thereof and for separating said first mold part with said parison from said second mold part, blow mold means, means for enclosing said parison in said blow mold means, and means for blowing said parison to conform to said blow mold means to thereby form a complete article having a finish formed by said finish space.

3. In an apparatus for making plastic articles by movement of a mold assembly to reduce the volume of a body of plasticized material and thereby displace plasticized material from the body into the mold assembly, the improvement wherein said mold assembly is comprised of a first movable mold part including a core pin and annular means about said core pin forming with said core pin a finish space for the molding of a finish portion of a parison, and means including a second movable mold part defining a chamber of variable volume for containing the body of plasticized material, and wherein said apparatus further includes means for moving said first mold part (1) into contact with said second mold part to form a mold cavity communicating with said finish space, and (2) jointly with said second mold part to reduce the volume of said chamber and thereby force plasticized material into said mold cavity and said finish space to form a parison, means for returning said first and second mold parts to positions wherein said chamber is at the original volume thereof and for separating said first mold part with said parison from said second mold part, blow mold means, means for enclosing said parison in said blow mold means, and means for blowing said parison into conformity with said blow mold means to thereby form a complete article having a finish portion formed by said finish space.

References Cited

UNITED STATES PATENTS

| | | | |
|---|---|---|---|
| 2,706,308 | 4/1955 | Lorenz | 18—5 X |
| 2,896,257 | 7/1959 | Norman et al. | 18—30 |
| 3,032,810 | 5/1962 | Soubier | 18—5 X |
| 3,169,275 | 2/1965 | Compton et al. | 18—30 |
| 3,314,105 | 4/1967 | Amsden | 18—5 |

WILBUR L. McBAY, Primary Examiner

U.S. Cl. X.R.

18—30

UNITED STATES PATENT OFFICE
CERTIFICATE OF CORRECTION

Patent No. 3,503,095                                                       March 31, 1970

Albert R. Uhlig

It is certified that error appears in the above identified patent and that said Letters Patent are hereby corrected as shown below:

Column 5, line 53, after "blow mold means" insert -- means for enclosing said parison in said blow mold means, --.

Signed and sealed this 2nd day of March 1971.

(SEAL)
Attest:

Edward M. Fletcher, Jr.                                       WILLIAM E. SCHUYLER, JR.
Attesting Officer                                                  Commissioner of Patents